United States Patent [19]

Hicks et al.

[11] Patent Number: 5,982,892
[45] Date of Patent: Nov. 9, 1999

[54] SYSTEM AND METHOD FOR REMOTE AUTHORIZATION FOR UNLOCKING ELECTRONIC DATA

[76] Inventors: Christian Bielefeldt Hicks; Peter Janssen Creath, both of 12 Norris Rd., Somerset, N.J. 08873-2853

[21] Appl. No.: 08/995,555

[22] Filed: Dec. 22, 1997

[51] Int. Cl.[6] ........................................................ H04L 9/00
[52] U.S. Cl. .................................................. 380/4; 380/25
[58] Field of Search ..................................... 380/4, 23, 25, 380/30, 3, 49, 44, 59; 713/200

[56] References Cited

U.S. PATENT DOCUMENTS

| | | | |
|---|---|---|---|
| 5,235,642 | 8/1993 | Wobber et al. | 380/25 |
| 5,337,357 | 8/1994 | Chou et al. | 380/4 |
| 5,481,720 | 1/1996 | Loucks et al. | 395/700 |
| 5,490,216 | 2/1996 | Richardson, III | 380/4 |
| 5,586,186 | 12/1996 | Yuval et al. | 380/30 |
| 5,612,889 | 3/1997 | Pintsov et al. | 364/478.14 |
| 5,649,185 | 7/1997 | Antognini et al. | 395/609 |
| 5,754,761 | 5/1998 | Wilsey | 395/186 |

*Primary Examiner*—Tod R. Swann
*Assistant Examiner*—Trevor Quick Coddington
*Attorney, Agent, or Firm*—David Newman Chartered

[57] ABSTRACT

A system and method for controlling unauthorized access to software distributed to a user by a vendor in which a verification key is generated by a product key generator and either embedded in the software prior to distribution or packaged with the software as a self-installing package. The verification key includes a private signing key and a public verification key. The combination of the software and the verification key create distributable software which is distributed to a user. The user installs the software on a user computer system as protected software. To obtain a user key, the user inputs user identifying information which is sent to a user key generator. The user key generator converts the user identifying information to a numeric representation and then generates, by signing the numeric representation with the private signing key, a user key, which is returned to the user. Using the verification key, a user key verifier verifies a relationship between the user key and the user identifying information to determine an access level to the protected software. The system verifies the relationship between the user key and the user identifying information every time the software is run to ensure continued protection of the software after installation.

18 Claims, 20 Drawing Sheets

SYSTEM AND METHOD FOR REMOTE AUTHORIZATION FOR UNLOCKING ELECTRONIC DATA

BACKGROUND OF THE INVENTION

This present invention provides a system and method for remotely authorizing the unlocking of electronic data, and more particularly for authorizing the unlocking of data using cryptographic authentication.

DESCRIPTION OF THE RELEVANT ART

The distribution of software from vendors to authorized users is susceptible to abuse in that the authorized users may share the software with unauthorized users. Attempts have been made to restrict software use through encryption. When a user purchases the software, the vendor provides a decryption key. If the decryption key is the same for all users, this approach will not protect the software in that one user can share the key with many others with no accountability. Therefore other systems generate a unique key for each user. One such system, described by U.S. Pat. No. 5,586,186 to Yuval et al., restores the distributable (encrypted) software to its original form (decrypted) upon installation. The user's decryption key is unique to that particular user. However, this system does not protect the software once it is installed.

SUMMARY OF THE INVENTION

The present invention, as broadly described herein, provides a method and system for controlling unauthorized use of software distributed to users. The main components of the system of the present invention include a product key generator, a user key generator, and a user key verifier.

The product key generator is responsible for generating a signing key or keys, and a verification key or keys. The user key generator generates a unique user key(s) using a numeric representation(s) of identifying information relating to a user; such identifying information optionally may include licensing information containing terms of permitted use and the signing key(s). The user key verifier determines whether the user key matches the identifying information as a means for controlling the use mode of the software. This use of digital signatures to generate user keys is both novel and nonobvious over the prior art.

The present invention also includes a method for controlling unauthorized use of software distributed by a software vendor. The method begins by generating a verification key with a product key generator. The verification key includes a private signing key and a public verification key. The software and the verification key are combined to create distributable software which is distributed to a user. The user installs the software on a user computer system as protected software. To obtain a user key, the user inputs user identifying information which is sent to a user key generator. The user identifying information may include licensing information as well as information on the user, the user's computer system, etc. The user key generator converts the user identifying information to a numeric representation and then generates, by signing the numeric representation with the private signing key, a user key. The user key is conveyed to the user computer system. Using the verification key, a user key verifier verifies a relationship between the user key and the user identifying information to determine an access level to the protected software.

A general object of the invention is software that executes a user key verifier at run-time to determine run-state as a means of protecting the software from unauthorized use.

Another object of the invention is a user key verifier that uses a public key signature verification algorithm to determine the validity of a user key.

An additional object of the invention is the use of digital signatures to generate user keys in a system for controlling unauthorized use of software distributed to users.

A further object of the invention is a system using the presence of a valid digital signature on licensing information to determine a program's mode of execution.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitutes a part of the specification, illustrate preferred embodiments of the invention and, together with the description, serve to explain the principles of the invention.

FIG. 4A illustrates protection of the software before distribution;

FIG. 4B illustrates a variation in which the software is protected at the time of installation;

DETAILED DESCRIPTION OF THE PREFERRED EMBODIMENTS

Figure 1:
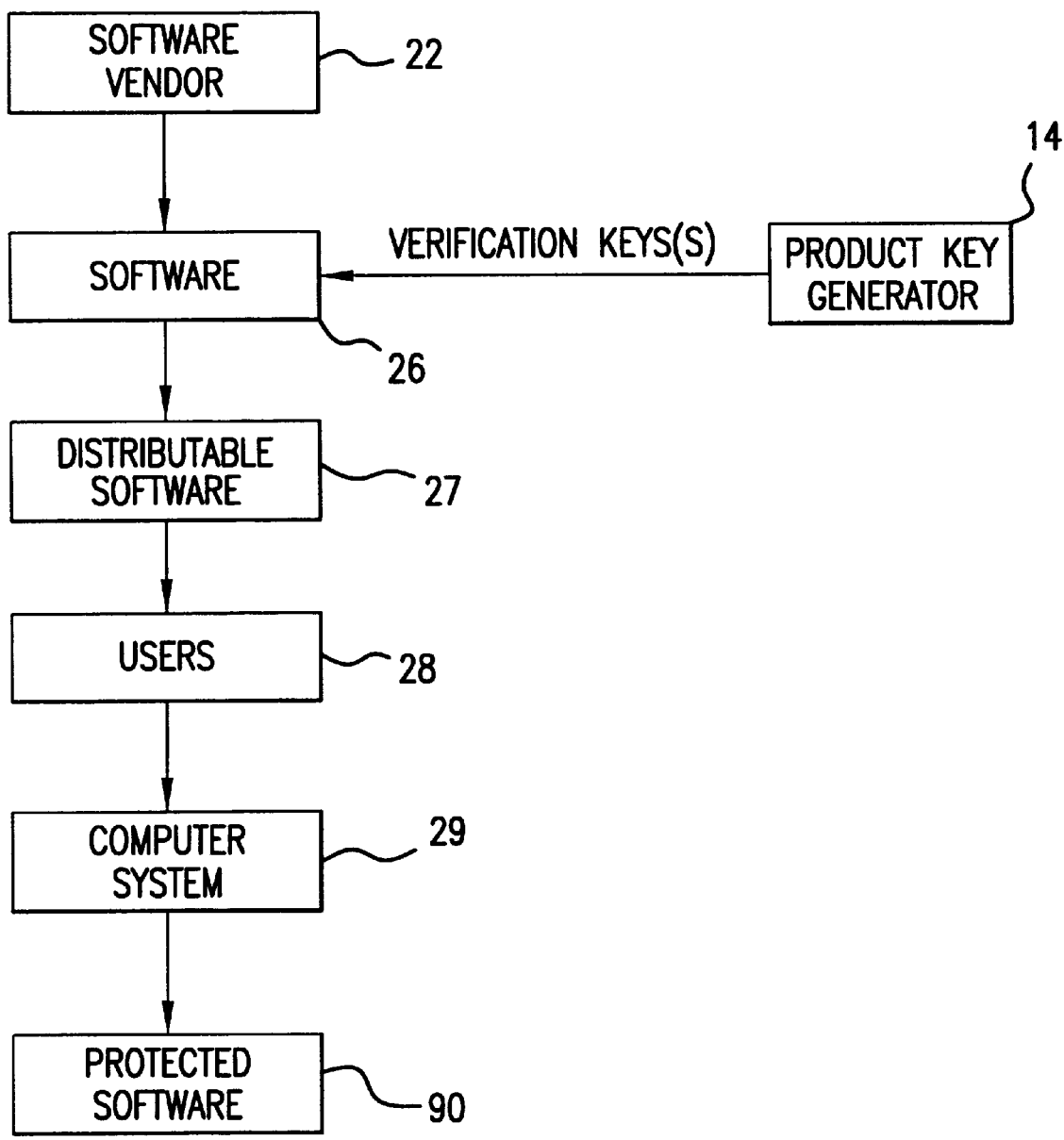
FIG. 1 is a block diagram illustrating software distribution from the vendor to the user using the product key generation components of the present invention.

Reference now is made in detail to the present preferred embodiments of the invention, examples of which are illustrated in the accompanying drawings, wherein like reference numerals indicate like elements throughout the several views.

The system and method of the present invention protects the software during both distribution and following installation. Distributable software includes a verification key. The verification key may be embedded in the software or may be packaged with the software as a self-installing distributable package. In either embodiment, the software is protected during distribution. In addition, the present invention does not preclude the incorporation of an additional encryption/decryption stage into the package, such as that described in U.S. Pat. No. 5,586,186 to Yuval et al., for enhanced protection during distribution.

Once installed, the present invention continues to control access to the software through a user key verification process which is initiated every time the software is run. An invalid attempt to verify the user key prevents or restricts access to the software. Whether used alone or in conjunction with an additional distribution protection scheme, the present invention proves protection to software following installation which is not afforded by other systems in the prior art.

As shown in FIG. 1, the software vendor 22 integrates one or more verification keys into the software 26. The verification keys are created with the product key generator 14. The software is now protected and is considered distributable software 27. The software enters the distribution channel and reaches the users 28. A user installs the software on the user's computer system 29, resulting in protected software 90.

Figure 2A:
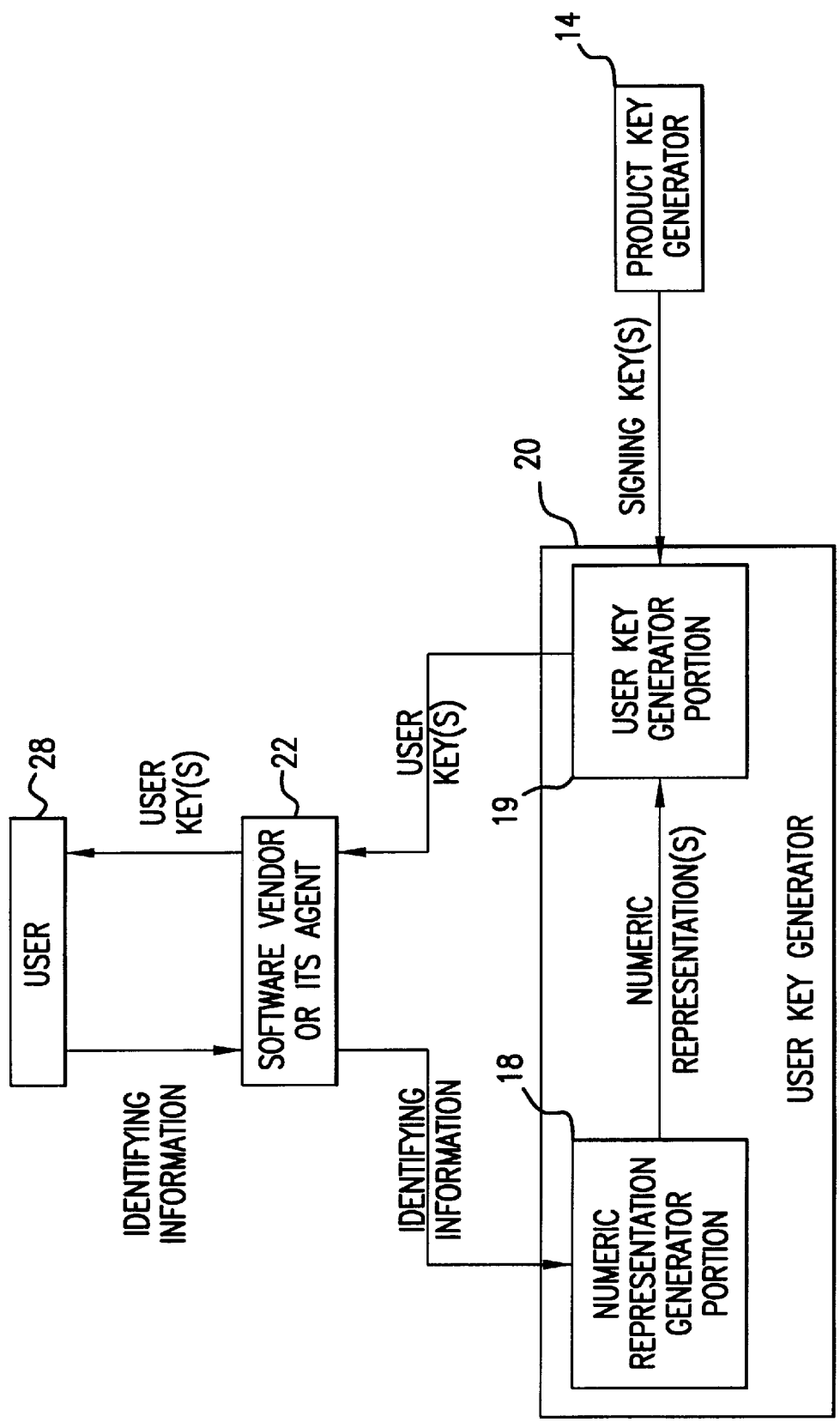
FIGS. 2A–2B are block diagrams illustrating user key generation components of the remote authorization for unlocking data system.
Figure 2B:
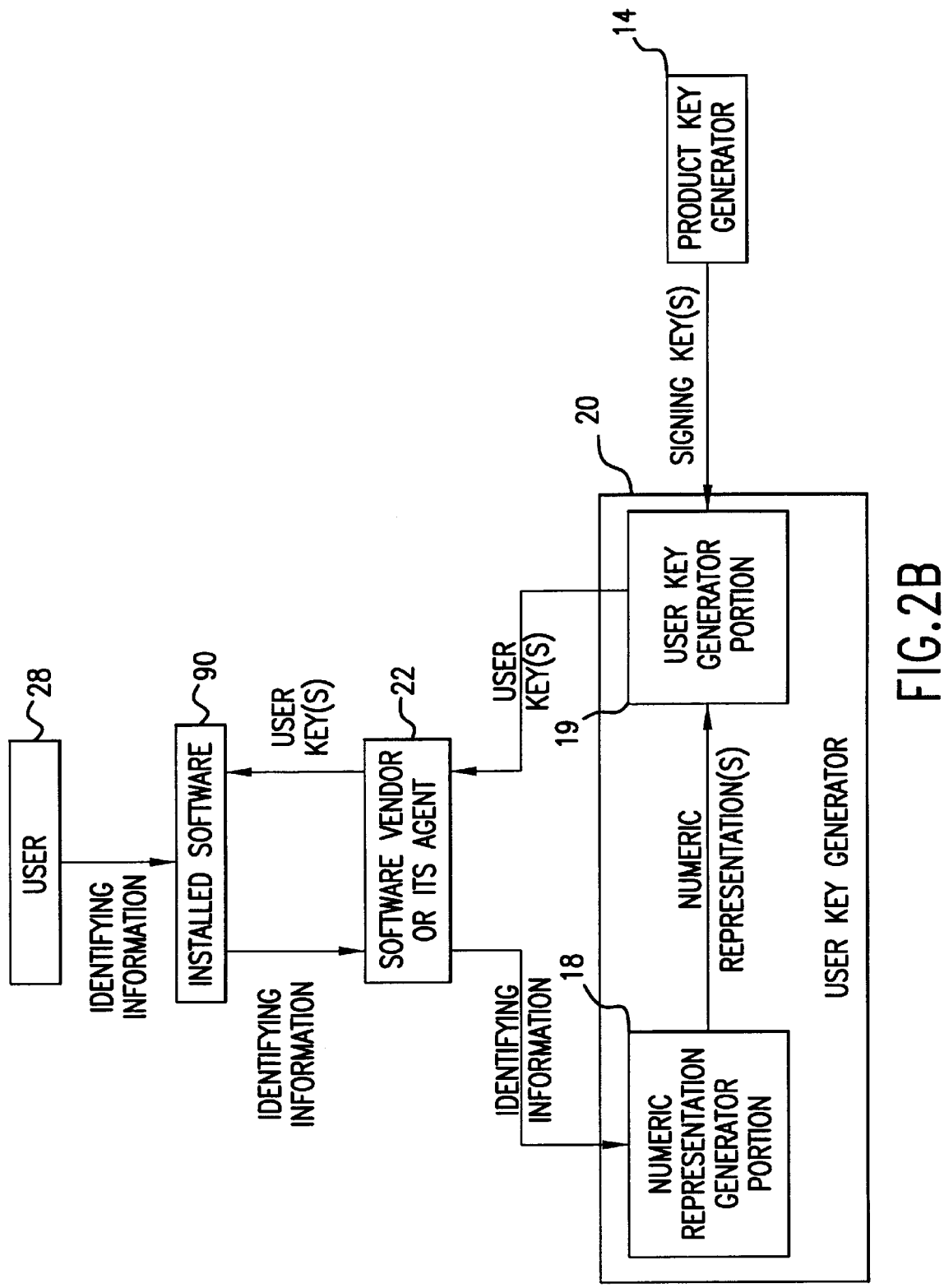

FIGS. 2A and 2B show how the user obtains a key. In FIG. 2A, the user 28 passes an ID which might be his name, machine ID, credit card number or other piece of unique identifying information, to the software vendor or a third-party agent 22. The ID and the signing keys for the product are passed into the user key generator 20. A numeric representation generator portion 18 converts the ID and signing keys into a numeric representation. A user key generator portion 19 uses the numeric representation to generate a user key for the user. This key is returned to the software vendor or third-party agent 22, who in turn passes it on to the user 28.

Of note is that the identifying information on which the numeric representation is based may include licensing information. This licensing information may or may not be passed from the user to the vendor. For example, the user may be able to specify a number of concurrent licenses. If not, the vendor will pass the additional information back to the user (or software).

In FIG. 2B, the same basic process is used, except that the user 28 does not communicate directly with the software vendor or third-party agent 22. Instead, the installed software 90 handles that communication for the user. Specifically, FIG. 2B illustrates that the software vendor 22 may communicate directly with the software rather than (or in addition to) the user.

Figure 3A:
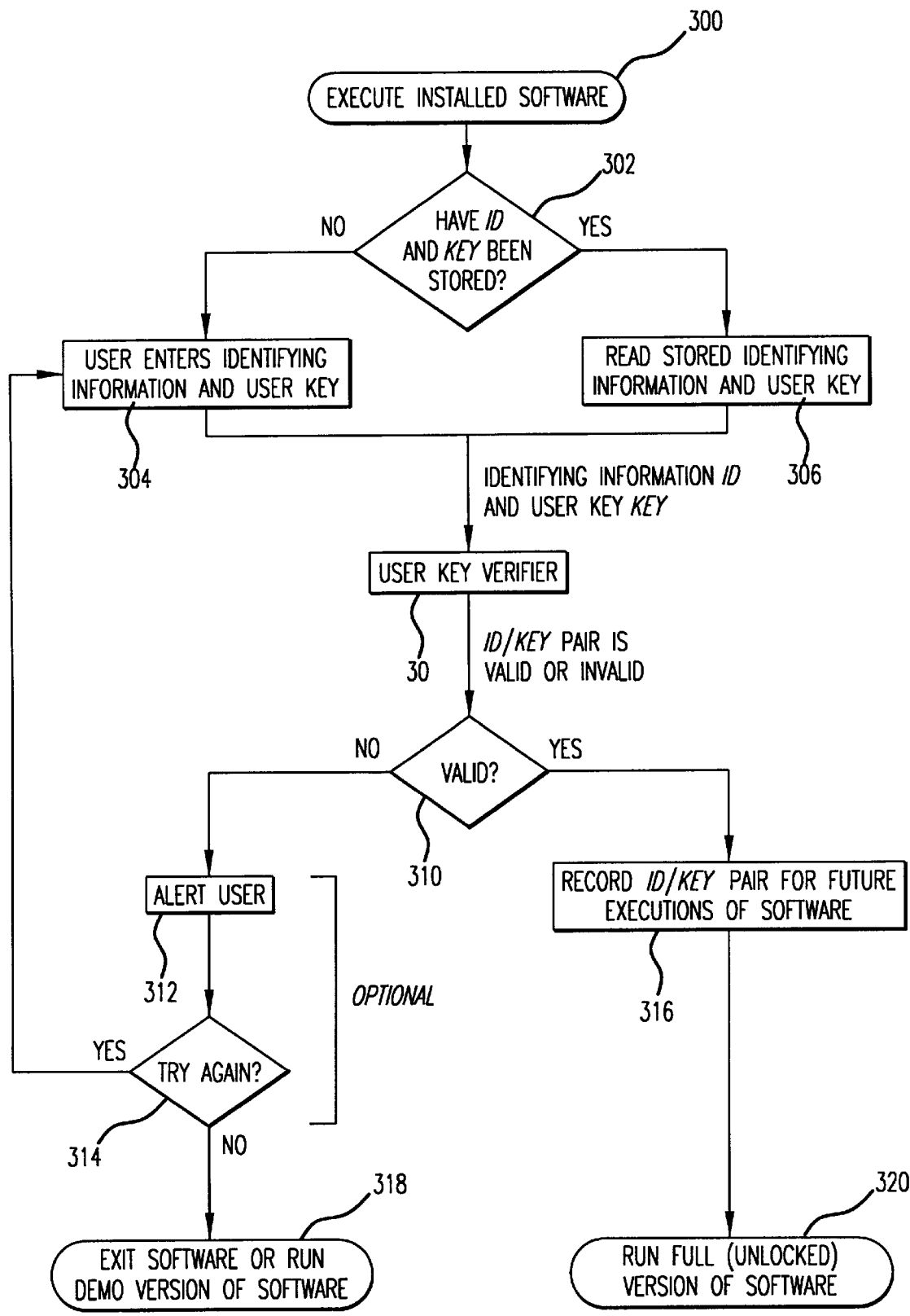
FIGS. 3A–3B are high level flow charts illustrating a sample use of the user key verifier to control the protected software's run state.
Figure 3B:
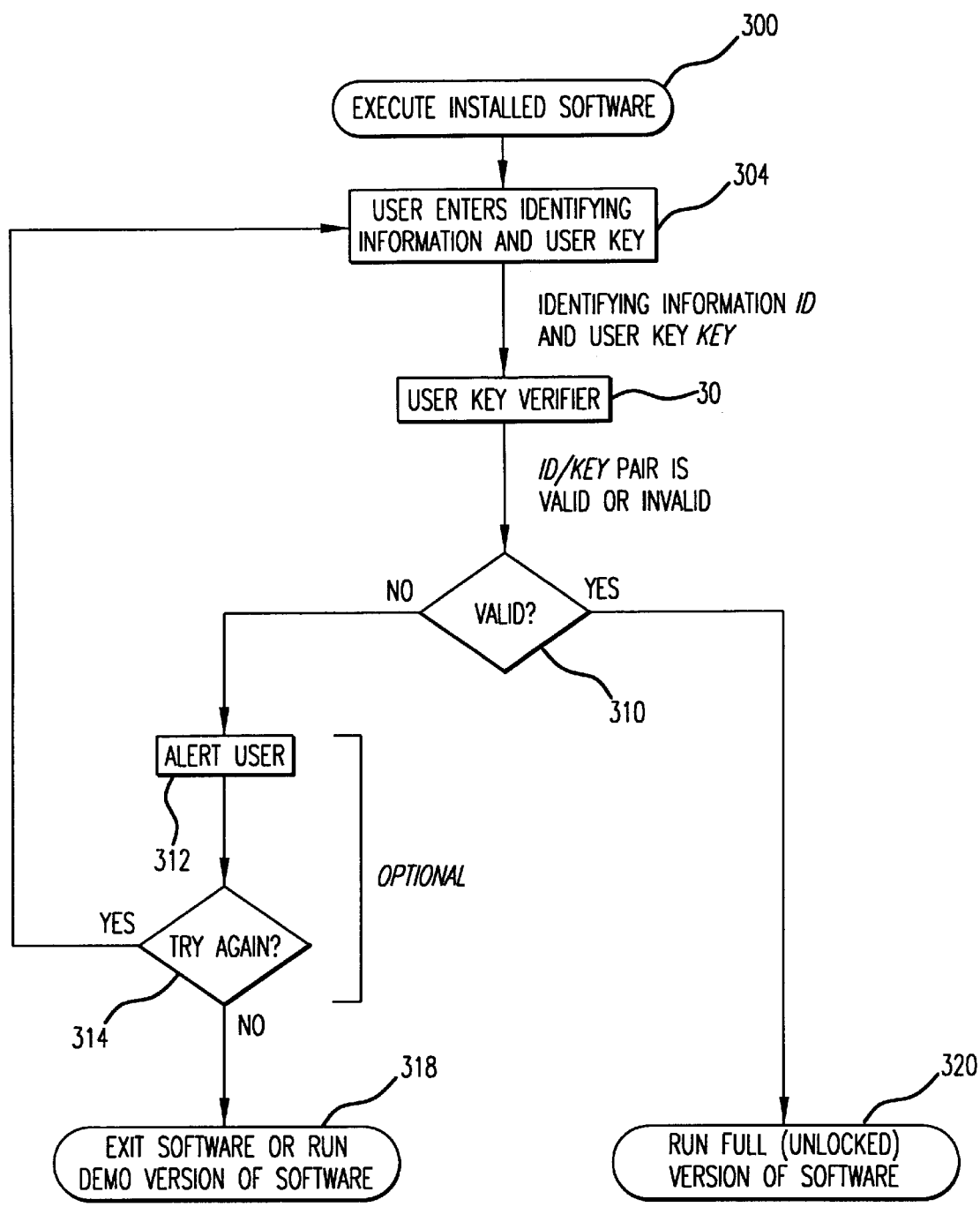

FIGS. 3A and 3B summarize execution 300 of the protected software 90 on the user's system. In FIG. 3A, the software checks to see if an ID and key for the product were stored 302 on the system. If an ID and key were not stored, then the user enters 304 identifying information and a user key. If an ID and key were stored, then the software reads 306 the ID and key and passes this information to the user key verifier 30. The user key verifier 30 determines whether or not the ID and key are valid 310.

If the ID and key were invalid 310, then the software prompts 312 the user to enter them. The software may allow the user only a limited number of entry attempts. If the user chooses to try again 314, and such entry is allowed, then the user enters identifying information and a user key 304 and the new ID and key are passed to the user key verifier 30. If the user does not try again 314, then the software determines that it is not unlocked and it exits or runs 318 a version of the program that is consistent with what the license agreement allows for, given that the ID and key have not been verified. typically the software either exits or runs 318 a demo version of itself.

When a valid ID and key combination reach the user key verifier 30, the ID and key are stored 316, so that subsequent executions of the software will not require the ID and key to be reentered, and the full, unlocked version of the software is run 320.

FIG. 3B illustrates the same basic execution of the installed software 300, but does not allow for the storing of the ID and key. Instead the user key is a one-time session key, meaning the ID and key must be entered 304 for each session of running the software.

Since the licensing information may be more detailed than a simple "locked" versus "unlocked" state, the "unlocked" version 320 would correspond to specified license restrictions. With reference to FIG. 3B, the system may receive the user key from the vendor directly, rather than from the user 304.

The fact that the software is verified at run-time is very important. Verifying the software only at the time of installation allows the installed files to be pirated. Verifying at run-time ensures that the user has a valid ID and key every time the program is run. Such protection for software following installation is not provided by the prior art systems, making the present invention a clear improvement over those systems, such as Yuval et al., that protect software only during its initial distribution.

Figure 4A:
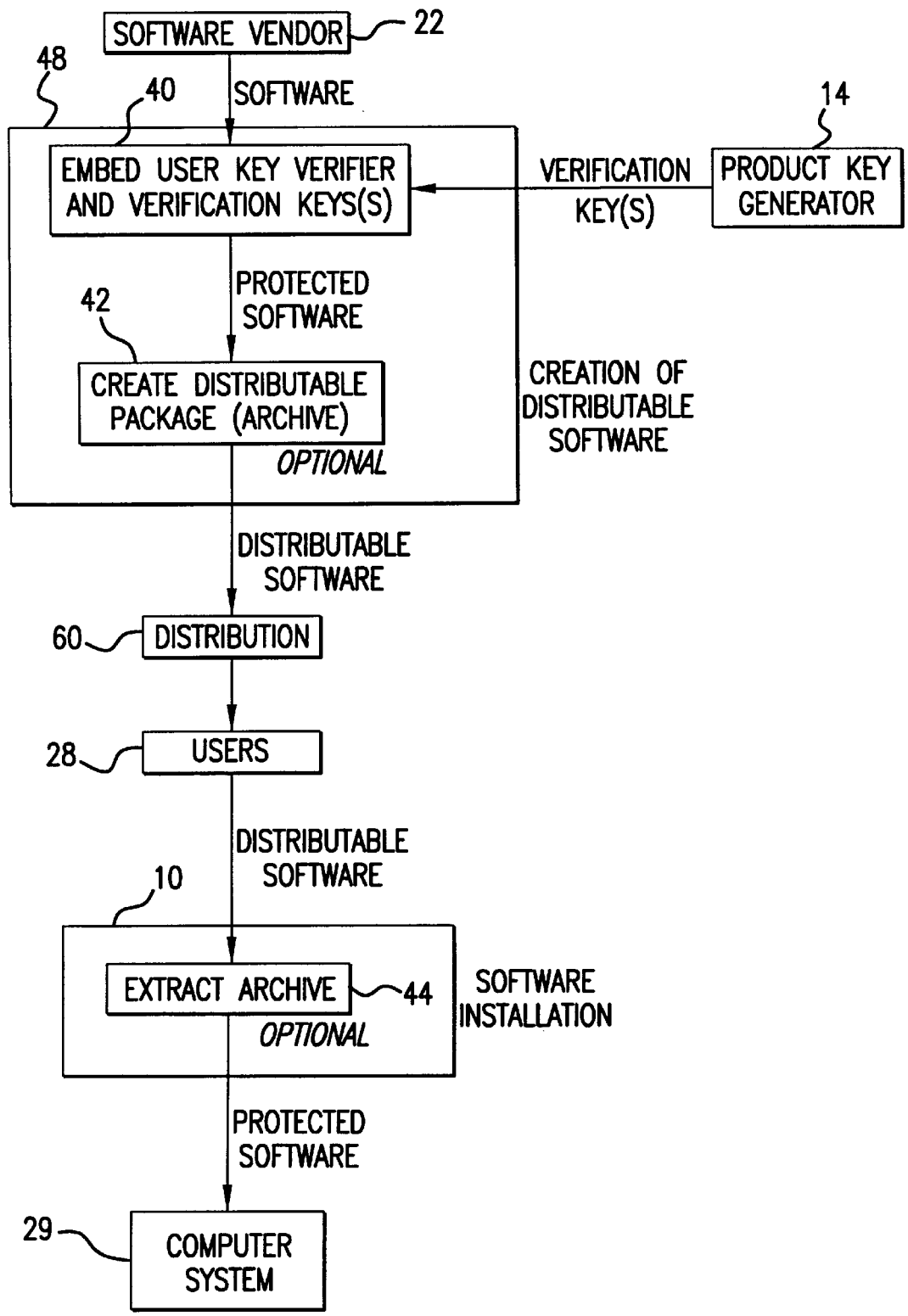
FIGS. 4A–4B are block diagrams showing in more detail the creation of distributable software and its installation.
Figure 4B:
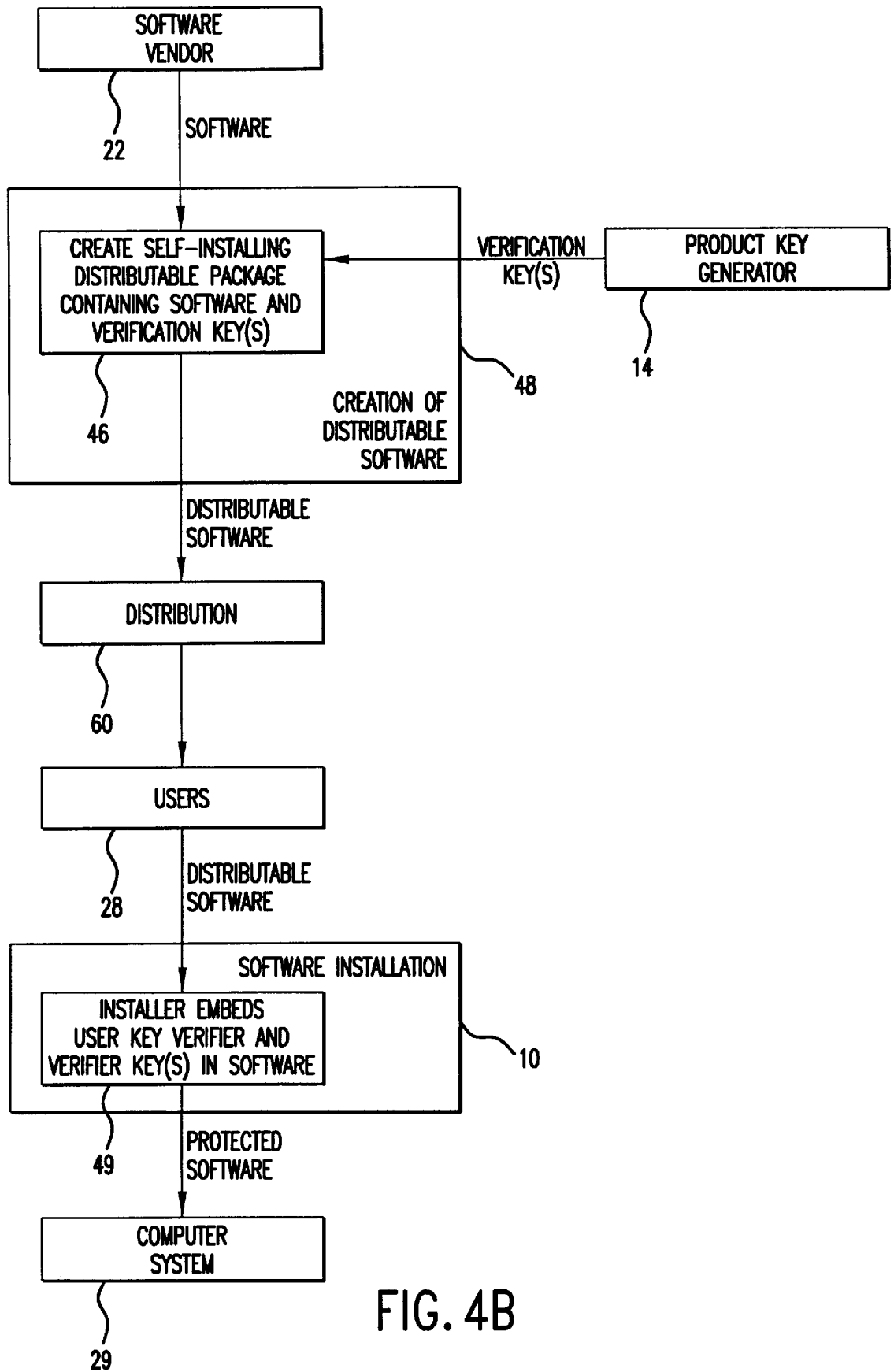

FIGS. 4A and 4B show how the protection system is built into the product. The product key generator 14 produces verification keys for the product. The verification keys may be, but need not be, unique for each different product. For example, multiple versions of the same product might use the same verification keys, or one software vendor may use the same verification keys for all of his products.

One method of utilizing the system of the present invention enables the software to have the verification key and user key verifier embedded in it at or before the time of installation and to have the software "unlocked" at run-time using a multiplicity of user keys, each of which is unique to a particular user. Since each user receives a unique user key and both the numeric representation and the user key are generated using the identifying information, if the user revealed the numeric representation and the user key, then the numeric representation and the user key could be traced back to the user who revealed it.

Another method of utilizing the system of the present invention leaves the verification key and user key verifier as separate entities accessible to the software. These entities could be implemented as standard operating system services designed to manage the licensing of software.

In FIG. 4A, the software is protected before distribution. The verification keys are embedded 40 into the product, which is then made 48 into a distributable package 42 and sent down the distribution channel 60. Users 28 acquire the software from the distribution channel 60 and install 10 the software. During software installation 10, the protected software is extracted 44 onto the user's computer system 29.

In FIG. 4B, the software and the verification keys are not integrated before distribution but instead are simply packaged together in a self-installing distributable package 46 and sent down the distribution channel 60. The users 28 obtain the self-installing distributable package from the distribution channel 60 and run it to extract the unprotected software and embed in it the user key verifier and verifier keys, converting the unprotected software to protected software on the user's computer system 29.

Figure 5A:
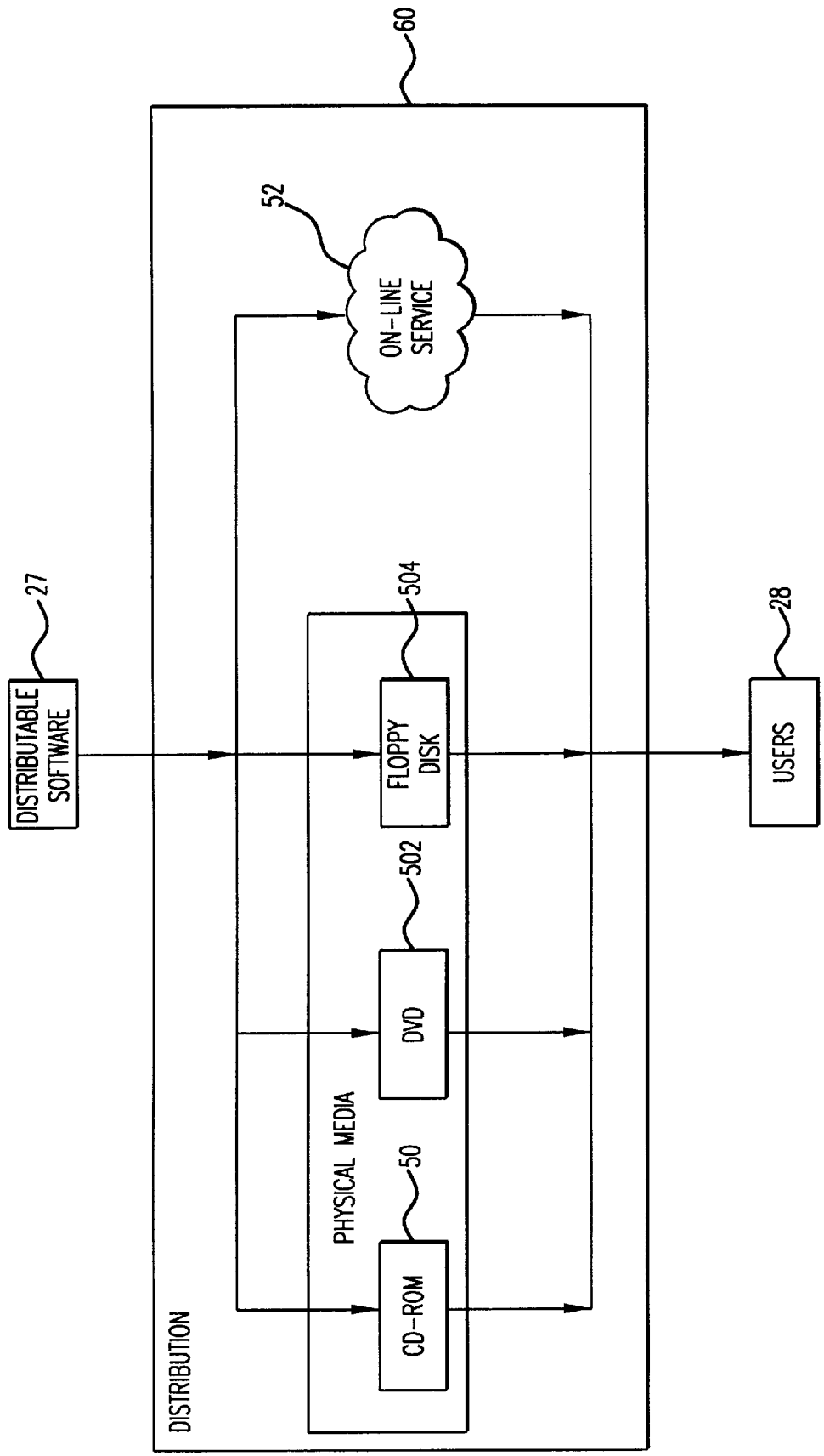
FIGS. 5A–5B are block diagrams illustrating several means of distributing software from the vendor to the user.
Figure 5B:
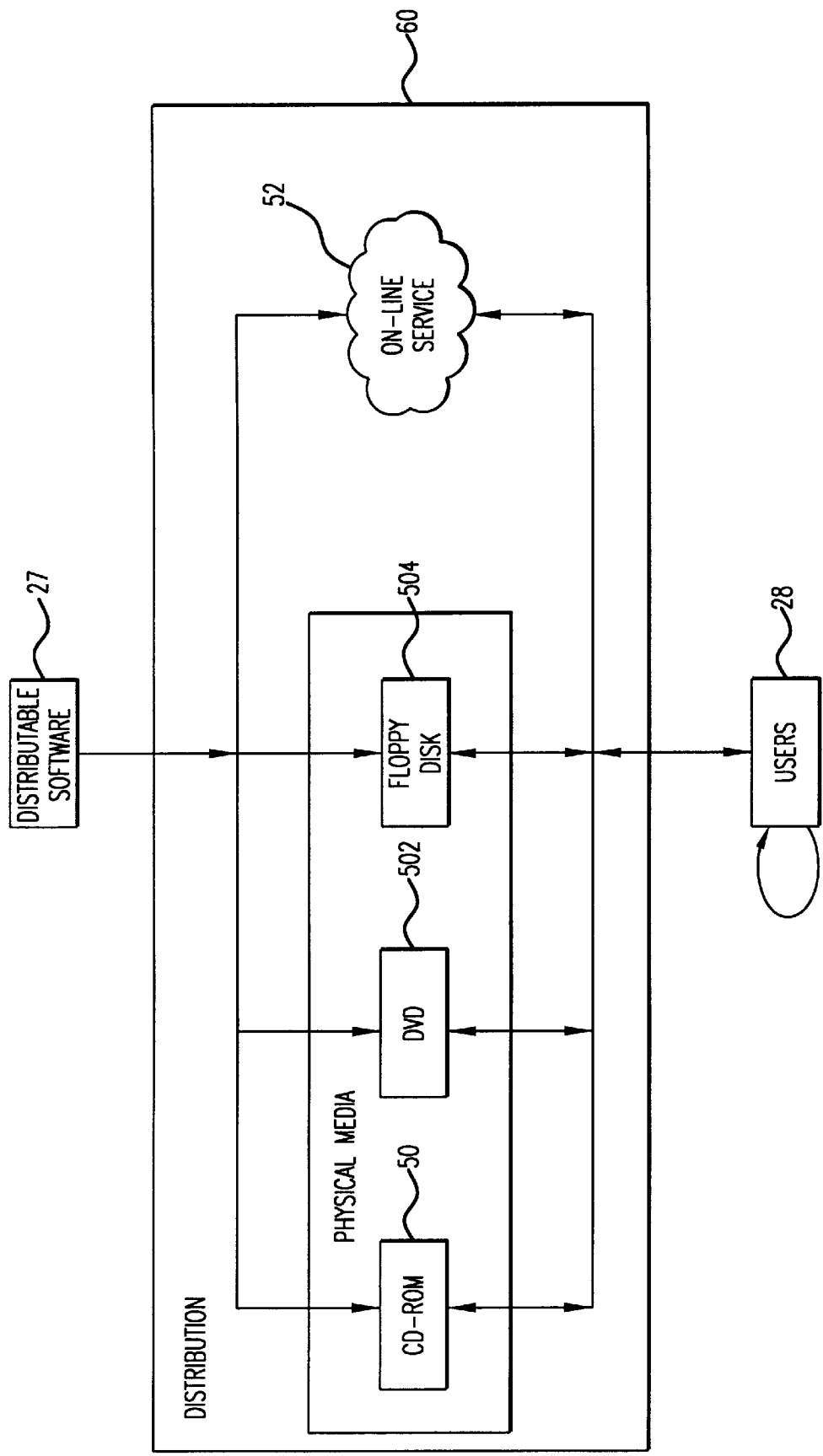

Possible methods of distribution are shown in FIGS. 5A and 5B. In FIG. 5A, the distributable software 27 passes through a one-way process, like a retail store. The distributable software 27 is made available on physical media like CD-ROM's 50, DVD 502, or floppy disks 504, on which the software reaches the user 28. The software may be distributed on physical media via conventional channels, e.g. retail, mail-order, directly, etc. One example of this would be if the distributable software were acquired from a retail store. Additionally, FIG. 5A illustrates the distribution via an on-line service 52, e.g., Internet site, dial-up BBS, or other service. This distribution may take the form of a subscription or a retail purchase.

FIG. 5B shows the "shareware" model, in which the users 28 may pass the distributable software 27 amongst themselves in addition to obtaining it from designated providers. Physical media may be employed, e.g., the software may be included on compilation CD-ROMs, but is not required. The software may be transmitted from location to location electronically, between on-line services, users, and so on.

Figure 6:
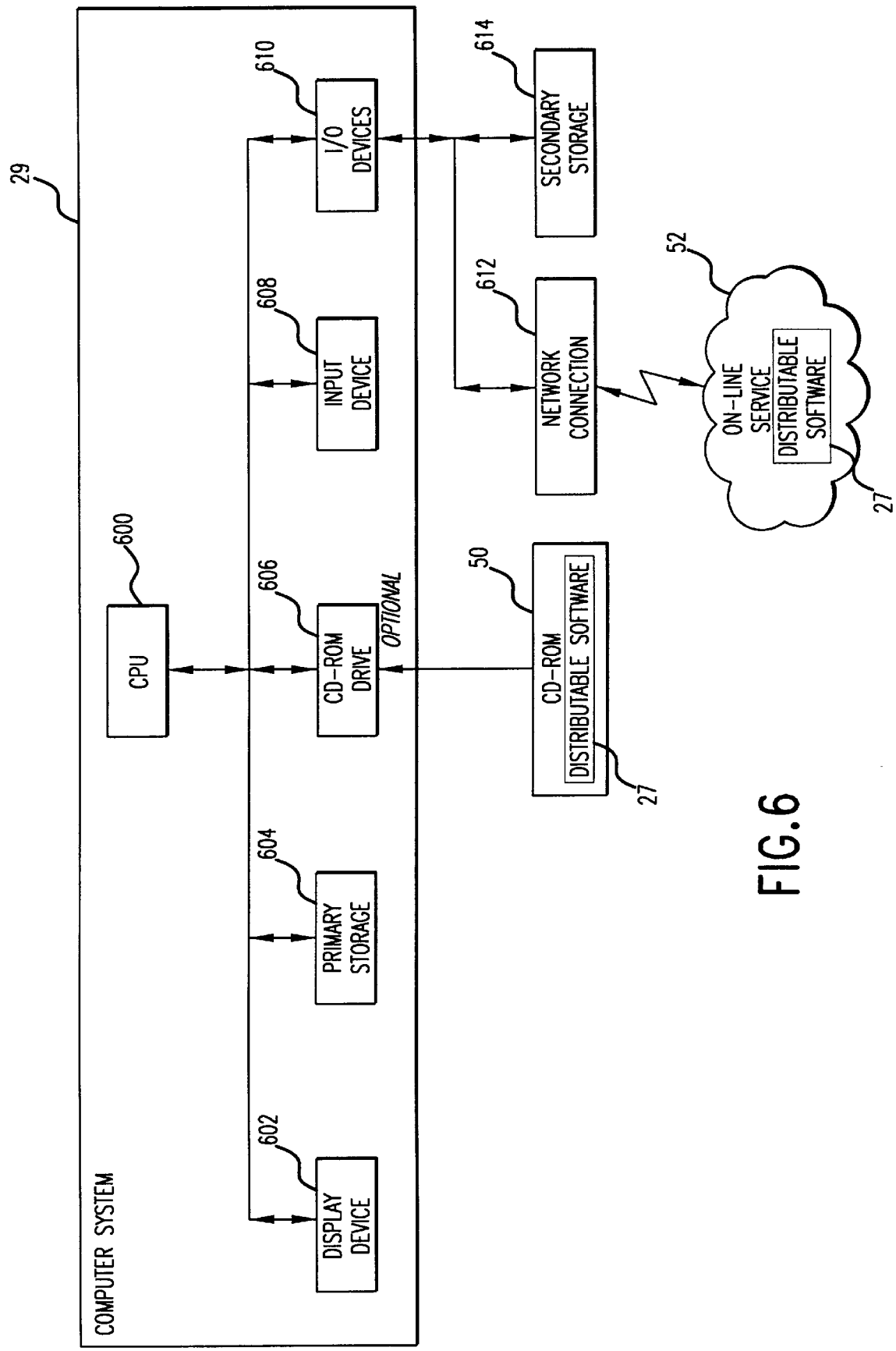
FIG. 6 is a block diagram illustrating the components of a user's computer system using a CD-ROM distributed by a software vendor or an on-line service providing the software.

FIG. 6 shows how the distributable software 27 may be used on the user's system. The user's system would typically include a central processing unit 600, an input device 608, input/output devices 610, a display device 602 and a primary storage device 604. The software might be run directly from a CD-ROM drive 606, or moved from CD-ROM 50, the network connection 612 or secondary storage device 614 to the primary storage device 604 and run from there. The network connection 612 may be connected to an on-line service 52 for accessing distributable software 27.

Figure 7A:
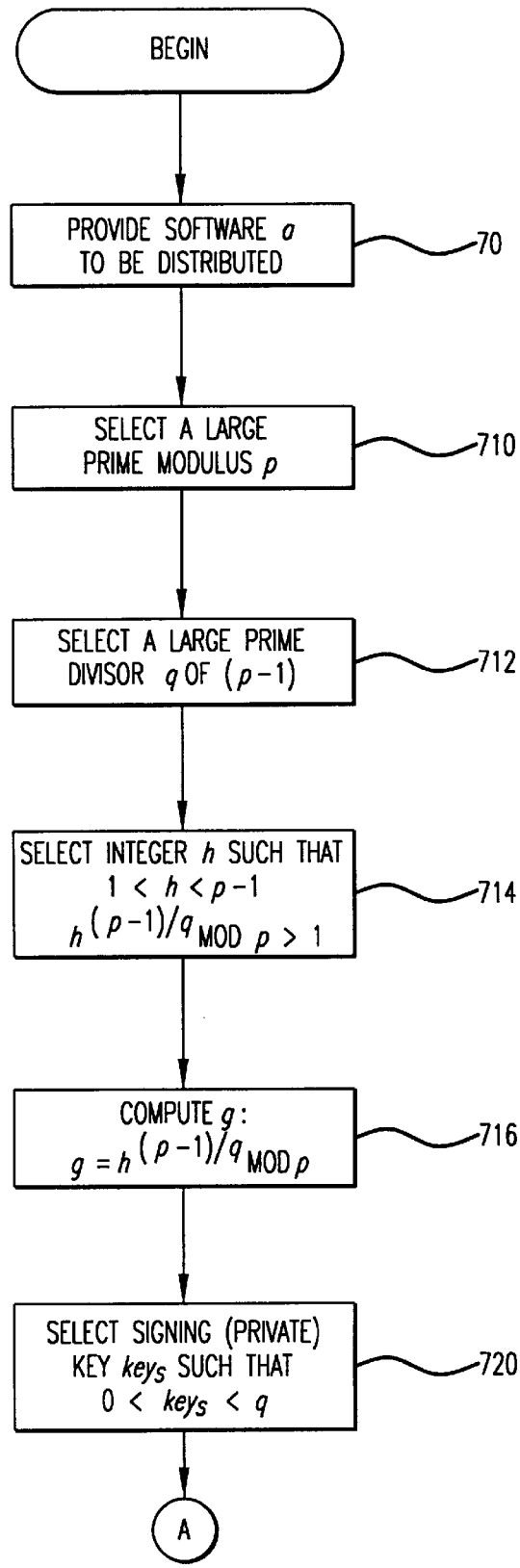
FIGS. 7A–7C collectively are a high level flow chart illustrating the steps performed in protection and run-time key verification in accordance with one method utilizing the system of FIGS. 1–3.
Figure 7B:
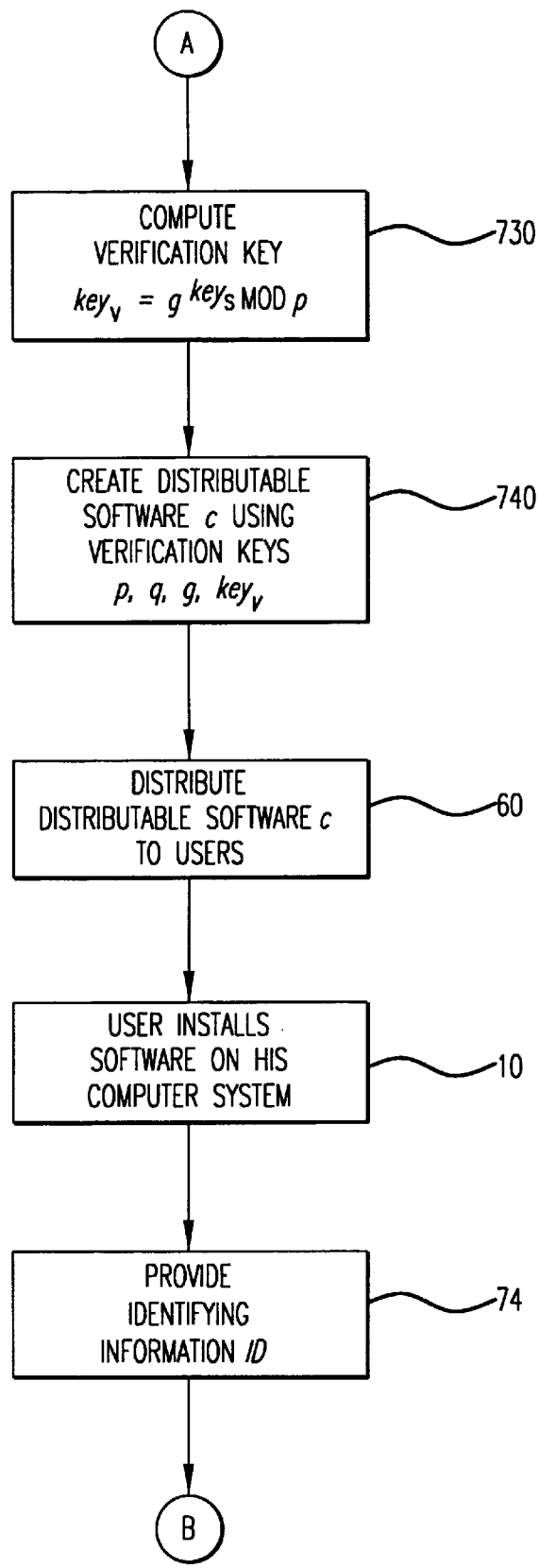
Figure 7C:
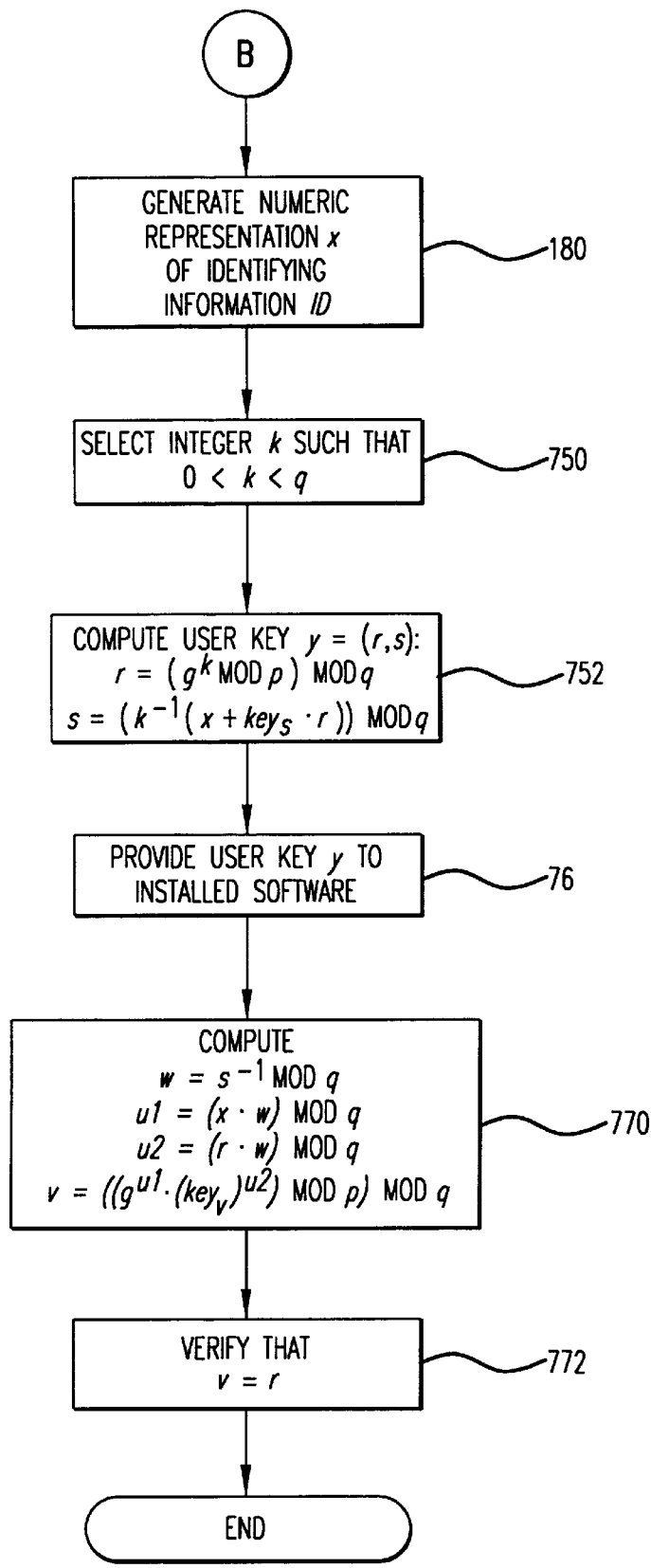

The steps performed in the protection and execution of protected software in accordance with one method utilizing the system of FIGS. 1–3 are illustrated in detail in FIGS. 7A–7C. Specifically, these figures illustrate the use of the DSA public-key signature algorithm for the key generation and Verification components. The preferred embodiment of the present invention uses the Digital Signature Standard specified by FTPS-186. In FIGS. 7A–7C, the DSA algorithm is used to construct the product key generator (710–730), user key generator (750–752), and user key verifier (770–772).

Initially, the software vendor provides 70 software a to be protected and distributed. The product key generator 14 selects 710 a large prime number p. According to the DSS standard, this number should be between 512 and 1024 bits; however the present invention is not restricted to a specific size.

The product key generator then selects 712 a large prime divisor q of p−1. According to the DSS standard, this number should be 160 bits long. Again, the present invention is not restricted to a specific size. Nevertheless, since the length of the user key is proportional to the size of q, our preferred embodiment allows for a variable size of q. The user key may be larger or smaller than 160 bits.

DSS is a modification of the ElGamal Signature Scheme.
. . . The ElGamal scheme is no more secure than the Discrete Logarithm problem, [which] necessitates the use of a large modulus p. Certainly p should have at least 512 bits, and many people would argue that the length of p should be 1024 bits in order to provide security into the foreseeable future.

However, even a 512-bit modulus leads to a signature having 1024 bits. For [the present application] a shorter signature is desirable. DSS modifies the ElGamal scheme . . . so that a 160-bit message is signed using a 320-bit signature, but the computations are done using a 512-bit modulus p. The way that this is done is to work in a subgroup of $Z_p^*$ of size $2^{160}$. The assumed security of the scheme is based on the belief that finding discrete logarithms in this specified subgroup of $Z_p^*$ is secure. Stinson, Douglas R. "Cryptography: Theory and Practice," (New York: CRC Press, 1995), p. 210–211.

The discrete logarithm problem in $Z_p$ is to "find the unique integer a, $0 \leq a \leq p-2$ such that:

$$\alpha^a \equiv \beta \pmod{p}$$

where p is prime, $\alpha \in Z_p$, is a primitive element, and $\beta \in Z_p^*$." (Stinson, p. 163). This integer a may be denoted by $\log_\alpha \beta$.

The Discrete Logarithm problem in $Z_p$ is generally regarded as being difficult if p is carefully chosen. In particular, there is no known polynomial-time algorithm for the Discrete Logarithm problem. To thwart known attacks, p should have at least 150 digits, and p−1 should have at least one "large" prime factor. The utility of the Discrete Logarithm problem in a cryptographic setting is that finding discrete logs is (probably) difficult, but the inverse operation of exponentiation can be computed efficiently. . . . Stated another way, exponentiation modulo p is a one-way function for suitable primes p. Stinson, p. 162.

To reiterate, varying the lengths of p and q will affect the security of the signature scheme. However, vendors may wish to trade security for faster computation by shortening p and/or q. Likewise, vendors may wish to trade security for shorter unlock codes by shortening q. Similarly, vendors may wish to increase security by lengthening one or both of p and q.

Next, the product key generator selects an integer g which is a qth root of 1 modulo p. Such a g is selected by first picking 714 a value h. The value g is then computed 716 by the function $g = h^{(p-1)/q} \bmod p$.

The product key generator 14 then picks 720 a random, or pseudorandom, integer less than q, which serves as the private (signing) key, which the present invention uses for signing the numeric representation x in the user key generator 20. Next the product key generator 14 calculates 730 the public (verification) key.

Since the signature algorithm of DSA uses p, q, g, and the public key (key_v), these values are considered the verification keys of this implementation. These values are used to create 740 distributable software c. Step 740 is the DSA implementation of the creation of distributable software 48 shown in FIGS. 4A and 4B.

The distributable software c is then distributed 60 to users. The user installs 10 the software on his computer system 29, if necessary, and executes the protected software. The following user key verification stages may, but need not, occur during installation.

The user then provides 74 his identifying information to the software vendor or its agent 22. As illustrated in FIG. 2B, the user may provide this information by way of the software. This identifying information may include information identifying the user, his computer system, and/or licensing information, such as a time limit, expiration date, number of concurrent licenses, etc.

The numeric representation generator portion 18 of the user key generator 20 creates 180 a numeric representation x of the identifying information ID. According to the DSS standard, this numeric representation should be the result of the Secure Hashing Algorithm (SHA), described in Federal Information Processing Standard FIPS-180 and FIPS 180-1. However, the present invention is not restricted to a specific algorithm for creating the numeric representation x.

The user key generator 20 selects 750 a random, or pseudorandom, positive integer k less than q. Then the user key generator calculates 752 the user key, y, which is the pair of values (r,s) calculated by the functions shown in FIG. 7C.

The user key, y, is then provided 76 to the installed software, either directly or via the user. The user key given to the program may contain information other than the cryptographic signature calculated in step 752. For example, the user key may contain a simple checksum to guard against typing errors. Additionally, if the user key is to be typed by the user, the user key needs to be converted to a readily typeable representation of its numeric value. The present invention is not restricted to any specific representation of the user key.

An example using a q of 65 bits will now be provided; thus r and s are each 65 bits long. We represent r and s as a sequence of 13 five-bit digits.

$$r \equiv r_{12} \times 2^{60} + \ldots + r_1 \times 2^5 + r_0 \times 2^0$$

$$s \equiv s_{12} \times 2^{60} + \ldots + s_1 \times 2^5 + s_0 \times 2^0$$

With five bits per digit, each digit may be represented with an alphanumeric character $c \in D = \{A–Z, 0–9\}$. Since the set of alphanumeric characters has 36 elements and a five-bit digit ranges over only 32 discrete values, the letter "I" and the number "1" are removed from the set, along with the letter "O" and the number "0". These characters are removed because they are difficult to distinguish from each other, making user-based entry of an unlock code unnecessarily difficult.

Picking an arbitrary permutation n of the set D, r and s are converted to r' and s' by mapping each of their digits to alphanumeric characters, where 0 maps to the first element of π, 1 maps to the second, and so on.

$$r' \leftarrow \pi_{r12} \| \pi_{r11} \| \ldots \| \pi_{r1} \| \pi_{r0}$$

$$s' \leftarrow \pi_{s12} \| \pi_{s11} \| \ldots \| \pi_{s1} \| \pi_{s0}$$

For example, let π be the set:

{A,B,C,D,E,F,G,H,J,K,L,M,N,P,Q,R,S,T,U,V,W,X,Y,Z,2,3,4,5,6,7,8,9}

Let r=8864298c84a96c (38390726480144748 decimal), s=d73c1194c95b5f19 (15509853497978478361 decimal). Thus:

r={0, 1, 2, 3, 4, 5, 6, 7, 8, 9, 10, 11, 12}
s={13, 14, 15, 16, 17, 18, 19, 20, 21, 22, 23, 24, 25}
r'=ABCDEFGHJKLMN
s'=PQRSTUVWXYZ23

In addition to the cryptographic signature, the unlock code may contain other information. For example, a vendor might use a product-specific prefix. Likewise, a vendor may wish to guard against user typing errors by including a checksum in the unlock code. As an illustration, an unlock code may be constructed of the following form:

u=Prefix‖Signature‖Checksum

The prefix will be "WID100" (for the fanciful product "Widget 1.0") and the checksum is the low 20 bits of the 32-bit CRC of (Prefix‖Signature). The signature (r', s') is represented by interlacing the characters. Using the values of r' and s' above, we have:

Prefix‖Signature=
 WID100APBQCRDSETFUGVHWJXKYLZM2N3

A CRC, or Cyclic Redundancy Code, is the remainder after binary division of the message by some generator polynomial. Checking a received CRC against a CRC calculated from the received message is a common technique for detecting data transmission errors. CRC's are essentially (cryptographically weak) hash functions. Let us use the generator polynomial:

$$x^{32} + x^{26} + x^{23} + x^{22} + x^{16} + x^{12} + x^{11} + x^{10} + x^8 + x^7 + x^5 + x^4 + x^2 + x^1 + x^0$$

(Algorithm taken from Heard, Charles Michael. "CRC-32 Code." <http://cell-relay.indiana.edu/cell-relay/publications/software/CRC/32 bitCRC.c.html>).

Calculating the 32-bit CRC of this string results in 5d60d4d2. Taking the low 20 bits of the CRC yields 0d4d2, or 54482 decimal. This number is then broken into 4 five-bit digits as was done with r and s above and mapped using π.

crc={1, 21, 6, 18} crc'={B, X, G, U} u=WID100APBQCRDSETFUGVHWJXKYLZM2N3BXGU

Hyphens may be inserted to make the serial number easier for a user to read. These hyphens have no inherent meaning and may be ignored. The final unlock code is then:

WID100-APBQCR-DSETFU-GVHWJX-KYLZM2-N3BXGU

A user key verifier would then reverse this process to retrieve the signature (r,s) and verify it against the identifying information. The presence of the checksum allows the user key verifier to detect and alert the user to typing errors, rather than simply treat a mistyped unlock code as an attempted forgery. The product-specific prefix allows the vendor to determine readily for which product the unlock code was generated.

As mentioned initially, there are an infinite number of such representations of the original signature (r,s). These representations may include product-identifying information, checksums, or other information. The focus of the present invention is the use of a cryptographic signature in an unlock code, not a specific representation of that signature. The above example has been provided solely to demonstrate how a signature might be represented in an unlock code.

The user key verifier 30 computes 770 v based on the signature (r,s) contained in the user key. If the value v is equal 772 to the portion of the signature r, then the signature is valid and the software continues to execute in a manner similar to that illustrated in FIGS. 3A–3B, starting at step 310.

The generation 180 of the numeric representation x may be partly based on additional licensing information; the identifying information may be considered licensing information, or even the software, or a portion thereof. The DSS standard dictates that the numeric representation x be calculated by x=SHA(id). The Secure Hash Algorithm (SHA) is described in FIPS-180 and FIPS-180-1.

Nevertheless, the present invention is not restricted to the use of a specific algorithm for generating the numeric representation x.

RSA Implementation

Figure 8A:
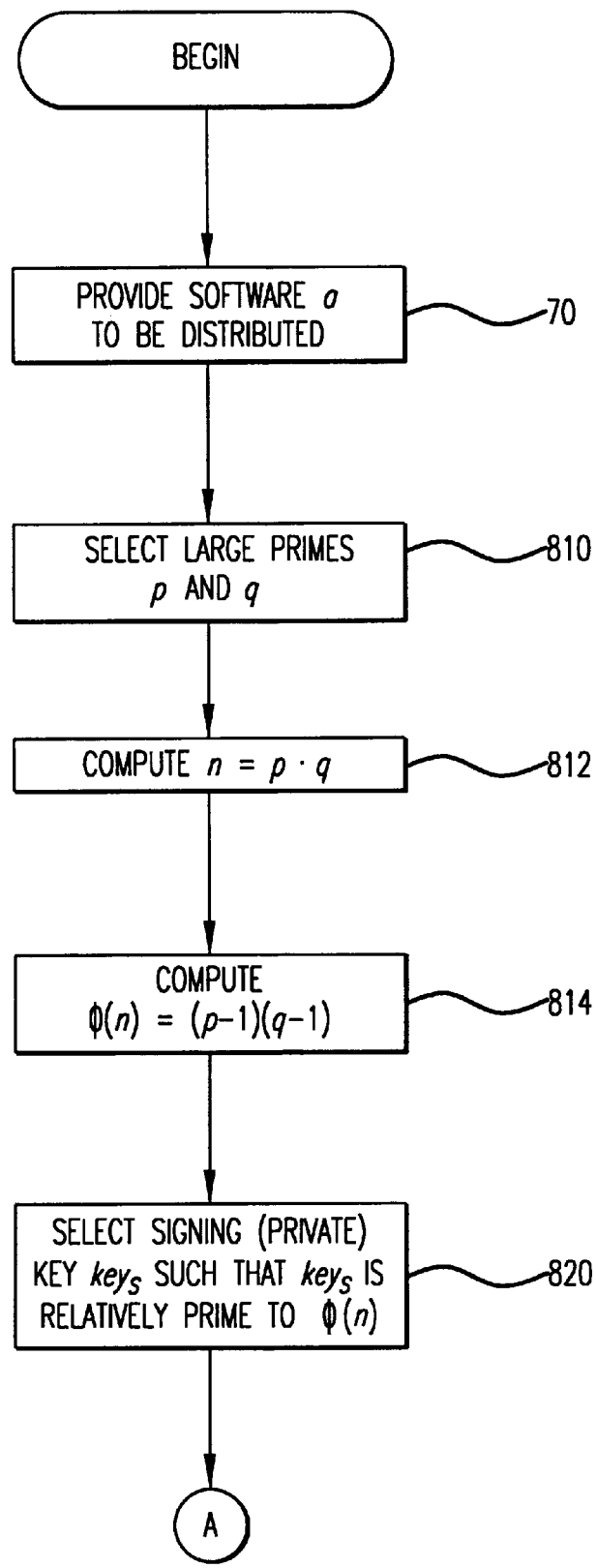
FIGS. 8A–8C collectively are a high level flow chart illustrating the steps performed in protection and run-time key verification in accordance with another method utilizing the system of FIGS. 1–3.
Figure 8B:
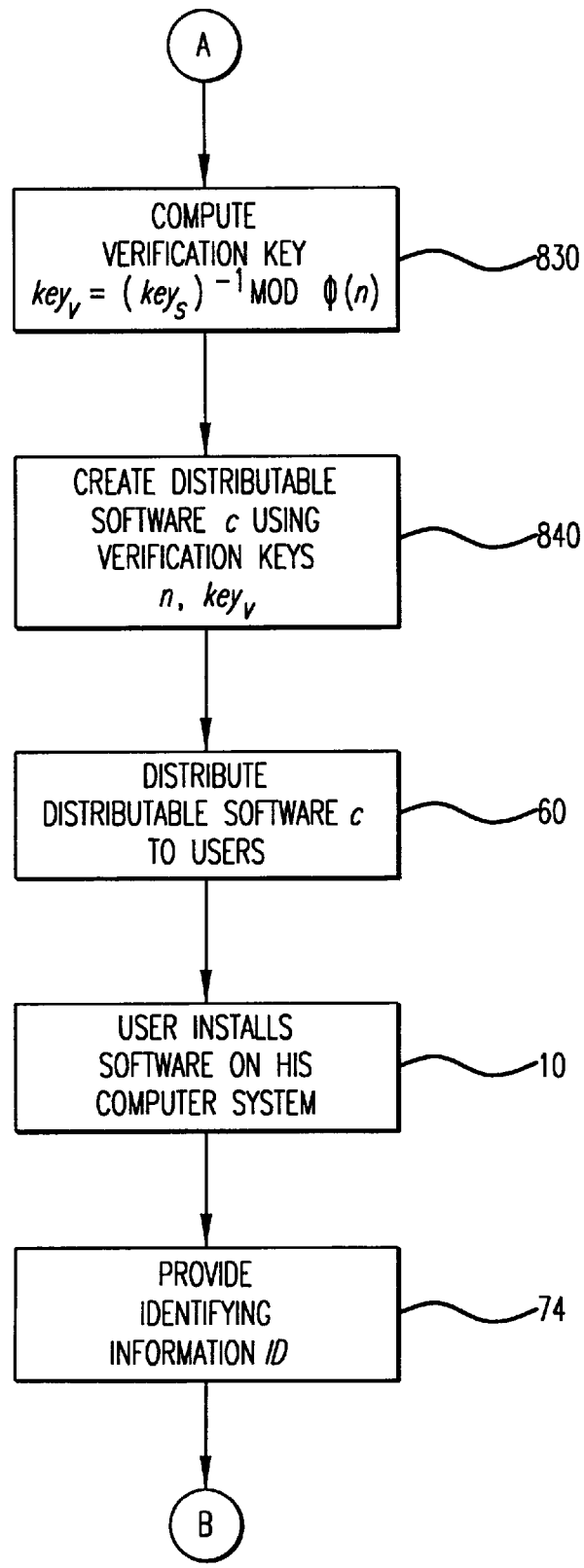
Figure 8C:
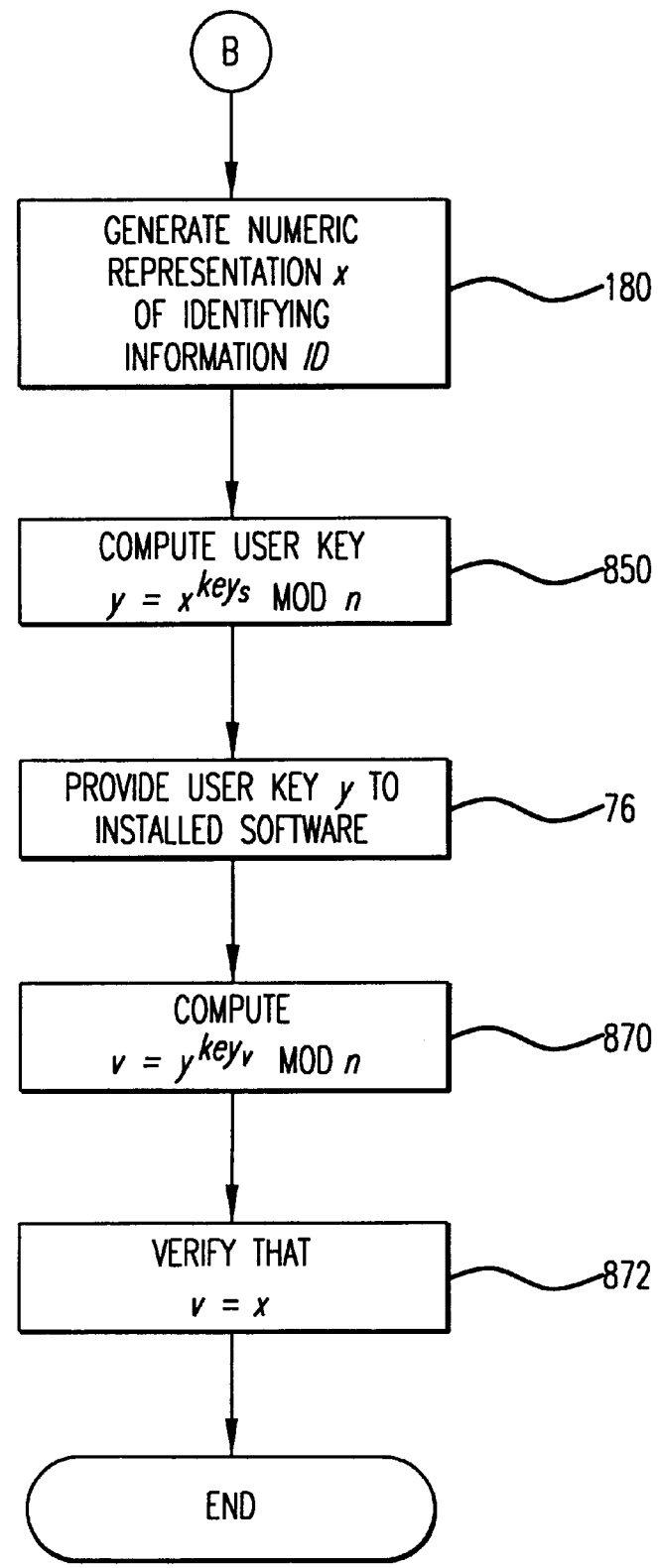

The steps performed in the protection and execution of protected software in accordance with another method utilizing the system of FIGS. 1–3 are illustrated in detail in FIGS. 8A–8C. Specifically, these figures illustrate the use of the RSA public-key signature algorithm for the key generation and verification components. In these figures, the RSA algorithm is used to construct the product key generator (810–830), user key generator (850–852), and user key verifier (870–872).

These figures correspond closely to FIGS. 7A–7C, using the RSA algorithm in place of the DSA algorithm.

Initially, the software vendor provides 70 software a to be protected and distributed. The product key generator 14 selects 810 large prime numbers p and q. Then the product key generator calculates n=pq. Since the security of RSA is based on the computational difficulty of factoring n, a product of two large primes, p and q should be at least 70 bits long. Again, the present invention is not restricted to a specific length.

The product key generator then calculates 814 Euler's totient $\phi(n)$. Next, the product key generator picks 820 a random, or pseudorandom, integer key_s such that key_s is relatively prime to $\phi(n)$, which serves as the private (signing) key, which the present invention uses for signing the numeric representation x in the user key generator portion 19 of the user key generator 20. Next the product key generator calculates 830 the public (verification) key by the function shown in FIG. 8B.

Since the signature algorithm of RSA uses n and the public key (key_v), these values are considered the verification keys of this implementation. These values are used to create 840 (distributable software c. Step 840 is the RSA implementation of the creation of distributable software 48 shown in FIGS. 4A and 4B.

The distributable software c is then distributed 60 to users. The user installs 10 the software on his computer system 29 (if necessary) and executes the protected software. The following user key verification stages may, but need not, occur during installation.

The user provides 74 his identifying information to the software vendor or its agent 22. As illustrated in FIG. 2B, the user may provide this information by way of the software. This identifying information may include information identifying the user, his computer system, and/or licensing information, such as a time limit, expiration date, number of concurrent licenses, etc.

The numeric representation generator portion 18 of the user key generator 20 creates 180 a numeric representation x of the identifying information ID. This numeric representation is typically the result of a cryptographic hashing algorithm. However, the present invention is not restricted to a specific algorithm for creating the numeric representation x. As in FIG. 7C, the generation 180 of the numeric representation x may be partly based on additional licensing information or the software itself.

The user key generator 20 calculates 850 the user key, y, using the function shown in FIG. 8C.

The user key is then provided 76 to the installed software, either directly or via the user. The user key given to the program may contain information other than the cryptographic signature calculated in step 850. For example, the user key may contain a simple checksum to guard against typing errors. Additionally, if the user key is to be typed by the user, the user key needs to be converted to a readily typeable representation of its numeric value. The present invention is not restricted to any specific representation of the user key.

The user key verifier 30 computes 870 v based on the signature y contained in the user key. If the value v is equal 872 to the numeric representation x then the signature is valid and the software continues to execute in a manner similar to that illustrated in FIGS. 3A–3B, starting at step 310.

Figure 9A:
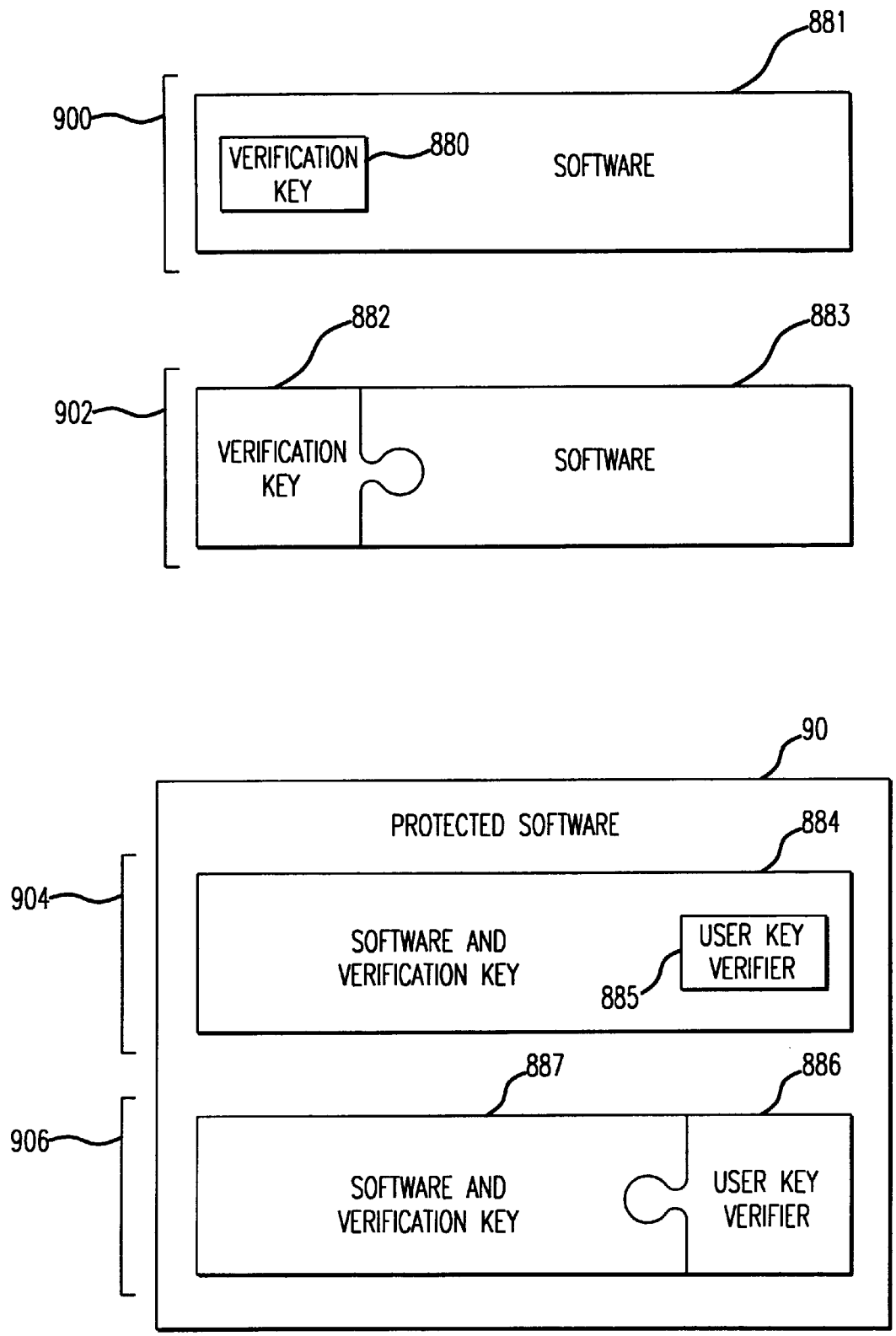
FIGS. 9A–9B illustrate some ways in which protected software may be constructed from components of the present invention.
Figure 9B:
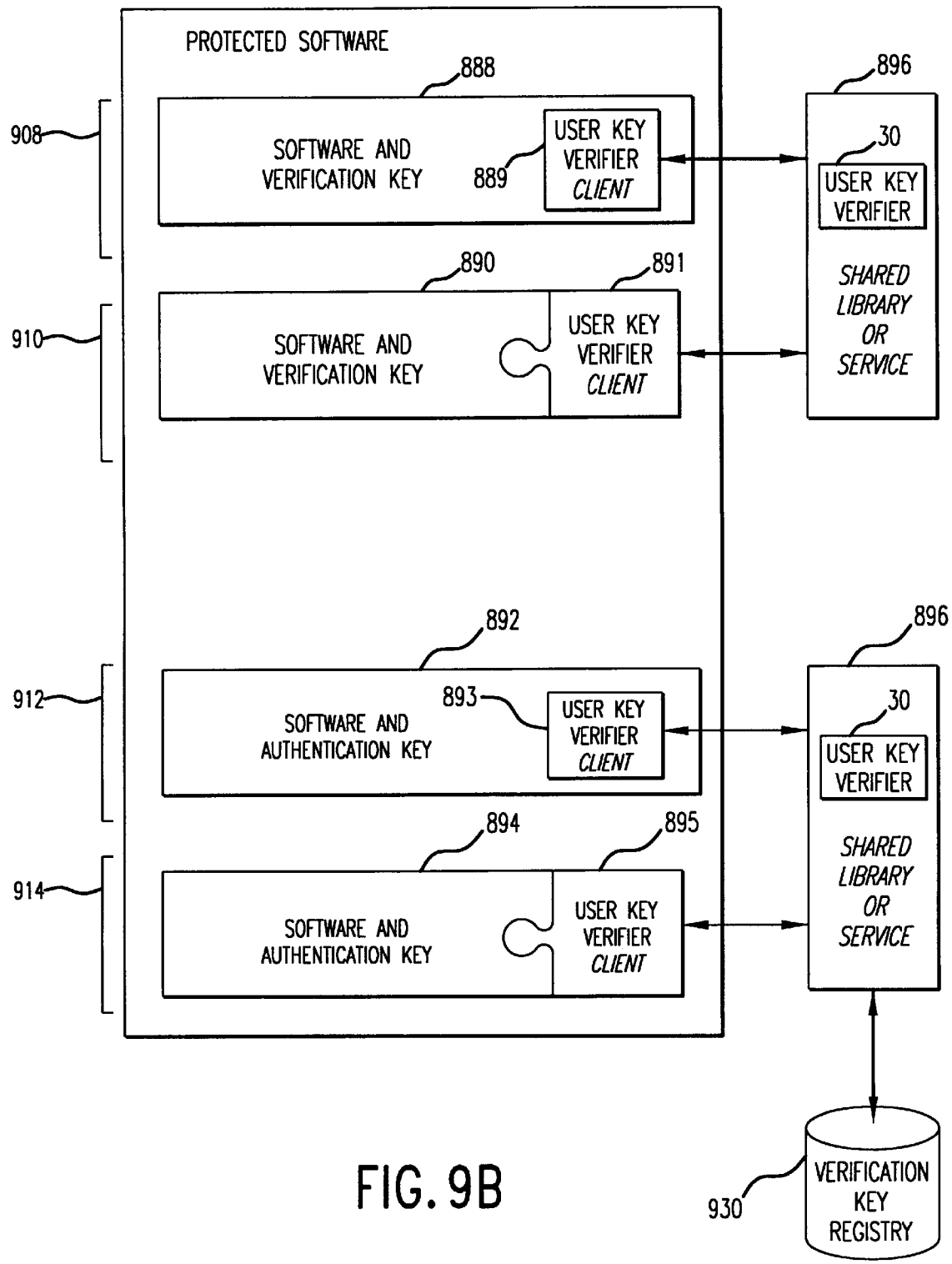

FIGS. 9A and 9B illustrate some combinations of software, laser key verifiers, and verification keys which produce protected software 90, including the embedding of components in the software. Two items are required for the protected software: the verification keys and the user key verifier.

In FIG. 9A, protected software 90 shows the normal model, in which the protected software contains or links to its own user key verifier. As shown in section 900, the verification key 880 may be actually contained in the software 881. Alternatively, as shown in section 902, the verification key 882 may be stored outside of the software 883, with the verification key(s) 882 "plugged into" the software 883, e.g., by being statically linked in with the object code, or by being placed in a standard location where the user key verifier can find the software. The former would have the user key verifier implemented within the software, e.g. by the vendor. The latter would have the user key verifier statically linked or similarly permanently bound to the software. Another means of binding the user key verifier to the software is to modify the software's startup code to first execute an implementation of a protection protocol as illustrated in FIGS. 3A–3B. This implementation would include the user key verifier. As shown in section 904, the user key verifier 885 may be actually contained in the software 884; alternatively, as shown in section 906 the user key verifier 886 may be linked into the software 887.

FIG. 9B details alternative models, in which the user key verifier 30 is contacted via a shared library or service 896. The shared library or service 896 might contain the user key verifier itself, or the library or service might contact a verification key registry 930 to reach the user key verifier. The present invention is not limited to specific means of integrating the user key verifier and verification key with the software.

In both of these situations, the verification key may be integrated into the software by any means, such as either of the means mentioned above. Once the software is protected, any reversible process may be performed on the software before the software reaches the end user. Reversing that process results in protected software.

One of ordinary skill in the art will immediately see two trivial variations in constructing protected software. The first, illustrated in sections 908 and 910, places the user key verifier 30 outside of the software itself. The second, illustrated in sections 912 and 914, places the verification key outside the software itself in a verification key registry 930. The present invention does not restrict the precise locations of the user key verifier and the verification key(s). They must simply be accessible to the software at run-time.

Section 908 shows software 888 with an internally-implemented client 889 and an external user key verifier 896. Such a construction might be comprised of internal calls to a programming interface (API) which make use of a shared library or other shared service. Other such shared services might include system-wide license servers, possibly as part of the operating system itself.

Section 910 shows a user key verifier client 891 "plugged into" the software 890. Such a construction might be implemented by having the service client 891 statically linked into the software 890, much as in the case of section 906.

Sections 912 and 914 show the verification key(s) not only outside the software itself, but also managed by the user key verifier service 896 with verification key registry 930. This arrangement is not the only possible one in which the verification key(s) exists outside of the software. Again, two means of integrating the client with the software are shown. The client 893 may be internal to the software 892. Alternatively, the client 895 may be "plugged into" the software 894. Naturally, by not embedding the verification key(s) within the distributed software, the verification key(s) need not be used in the creation of the distributable software 48 shown in FIGS. 4A and 4B.

Both of these variations require communication between the software and the external components, communication which is subject to interception and alteration. If the shared library or service 896 gave a simple "approval" or "disapproval" response to the software, then a hacker could readily create an impostor service which always gives its approval. In sections 908 and 910, the verification key can be used to verify the validity of the service's response. In sections 912 and 914, the internal verification key has been replaced by an internal "authentication key." Without an authentication key, which earlier could be the verification key, the software has no secure way of verifying the validity of the service's response.

Note that this variety in methods of constructing protected software leaves a great deal of latitude for implementation of the present invention. The protected software may be constructed by the software vendor, or by a third party such as a distributor or reseller. The user key verifier may be implemented within the software itself by the vendor; the user key verifier may also be added by a third party.

Figure 10A:
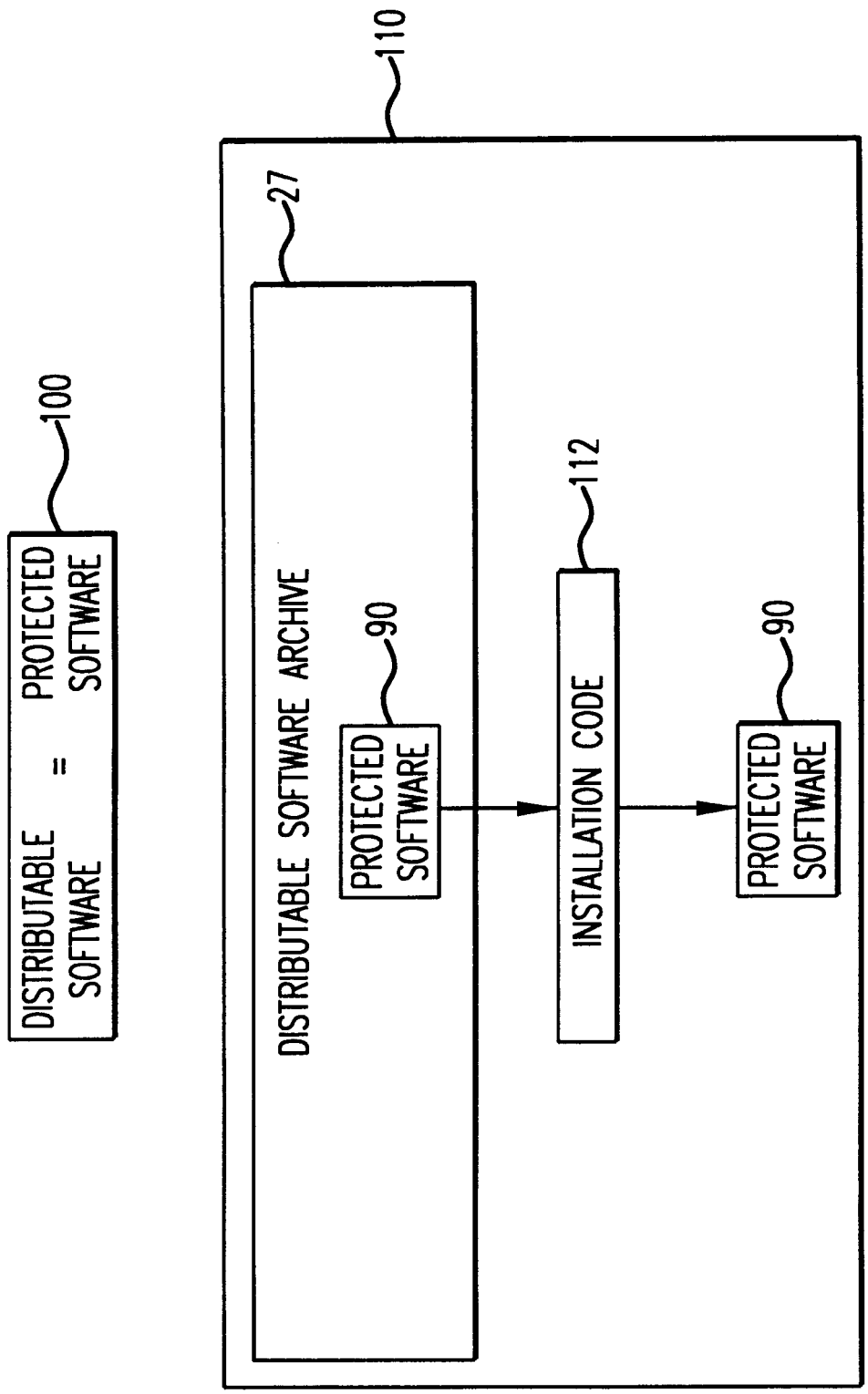
FIGS. 10A–10B illustrate several ways in which distributable software may be constructed and installed on a user's computer system.
Figure 10B:
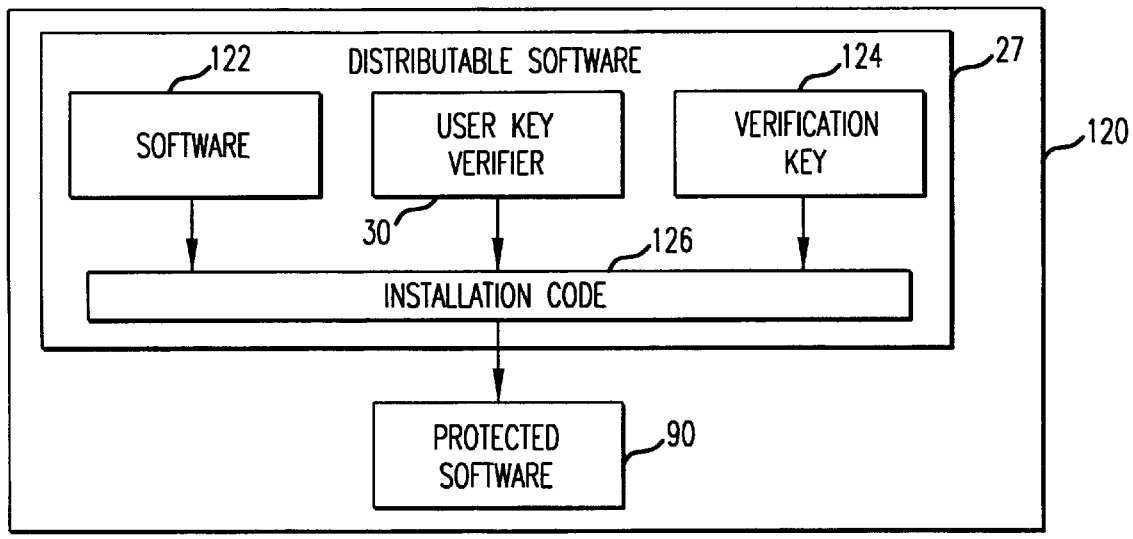
Figure 10B:
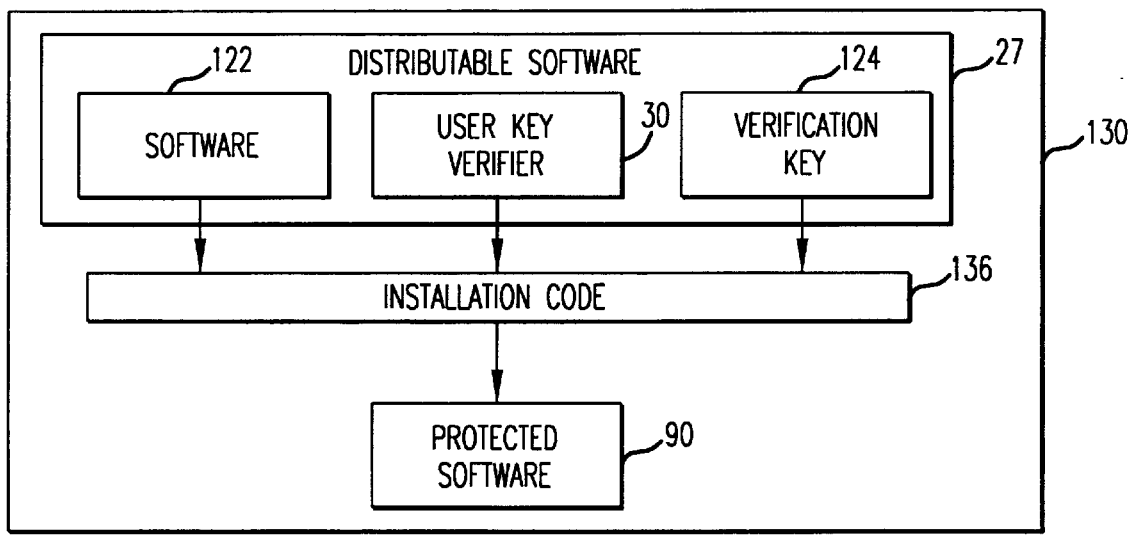

The difference between the two processes is shown in more detail in FIGS. 10A and 10B. FIG. 10A shows what the installer in FIG. 4A would look like. The software contained in the distributable software is already protected. FIG. 10B shows what the installer in FIG. 4B would look like.

The first section 100 of FIG. 10A shows the simplest case, in which the protected software is distributed as-is. The protected software requires no installation and may be executed in its distributable state. This case is frequently used with CD-ROM distribution, where the user may execute the software directly from the CD-ROM, without installing it on any other storage medium. Therefore the term "installed" software is used to differentiate between the software which is distributed and the software which is executed. There may be no practical difference. In this case, the optional steps 42 and 44 in FIG. 4A are not used.

The second section 110 of FIG. 10A shows another simple, and common, case, in which the protected software 90 is contained in the distributable software 27. The distributable software 27 may include other data, such as documentation, and is often compressed. Common examples of such archives are ZIP files, e.g., compressed archives created by PKZIP®. The installation code 112 in such a case would be the decompressor program. In the case of PKZIP®, there is a complementary PKUNZIP® program which decompresses and extracts the contents of the archive. The installation code may already exist on the user's computer system or may be distributed with the software itself.

In FIG. 10B, section 120 illustrates the installation code 126 as Dart of the distributable software 27. The unprotected software 122, user key verifier 30 and verification keys 124 are all contained in the installer. This situation can occur in the common case above, in the form of self-extracting distributable software archives. These distributable software archives have the extraction/decompression code built into the archive. PKZIP® is capable of creating executable self-extracting archives, for example.

Section 120 also illustrates the possibility of creating the protected software 90 from its components at the time of installation. Naturally, the security of such a scheme depends on the security of the archive. If someone can extract the archive contents without embedding the necessary protection components, then he can bypass the protection. The advantage of such a scheme over the pre-protected scheme is that the software need not be modified before distribution.

Additionally by including the user key verifier 30 and verification key(s) 124, the installer can use them itself. For example, the installer may handle the collection of identifying information and verification (and storage) of the resulting user keys. The installer may also choose not to install the software at all if the user keys are not valid.

The software need not be unprotected at this stage in order to include the user key verifier and verification key(s) for the installer's use. The software 122 in this section could be protected, and the user key verifier 30 and verification key(s) 124 could exist in the archive solely for the installer's use.

In the lower figure of FIG. 10B, the unprotected software, user key verifier and verification key are simply packaged along with the installation program. This system makes the software easier for the software vendor to distribute his product, since the software need not be modified directly. Note that either system described in FIG. 10B relies on the unprotected software not being extracted by any means which would leave it unprotected.

Section 130 simply illustrates explicitly that the installation code 136 need not be built into the distributable software 27. The installation code 136 may be a standard application program which the user can execute. It may also be an operating system service or other executable code which operates on the distributable software 27.

It will be apparent to those skilled in the art that various modifications can be made to the system and method for remote authorization for unlocking electronic data of the instant invention without departing from the scope or spirit of the invention, and it is intended that the present invention cover modifications and variations of the system and method for remote authorization for unlocking electronic data provided they come within the scope of the appended claims and their equivalents.

We claim:

1. A method for controlling unauthorized use of software distributed by a software vendor comprising the steps of:

generating, with a digital signature algorithm, a verification key with a product key generator;

combining software and the verification key to create distributable software;

distributing the distributable software to a user;

installing the distributable software on a user computer system as protected software;

inputting user identifying information to a user key generator;

converting, by the user key generator, the user identifying information to a numeric representation;

generating, using the numeric representation, a user key, with the digital signature algorithm;

conveying the user key to the user computer system; and verifying, with the verification key, a relationship between the user key and the user identifying information to determine an access level to the protected software.

2. The method as set forth in claim 1, with the step of combining further including the steps of:

embedding the verification key into the software; and embedding a user key verifier into the software, the user key verifier verifying, with the verification key, the relationship between the user key and the user identifying information.

3. The method as set forth in claim 1, the step of combining including the step of:

creating a self-installing distributable package containing the verification key, the software, and a user key verifier.

4. The method as set forth in claim 3, the step of installing including the step of:

running the self-installing distributable package to embed the verification key and the user key verifier into the software.

5. The method as set forth in claim 1, further comprising the step of:

storing the user key and the user identifying information and user key.

6. The method as set forth in claim 1, with the step of generating a verification key comprising the steps of:

generating, with the digital signature algorithm, a private signing key; and generating, with the digital signature algorithm, a public verification key.

7. The method as set forth in claim 6, with the step of generating a user key comprising the step of signing, using the digital signature algorithm, the numeric representation with the private signing key.

8. A system for controlling unauthorized use of software distributed to a user by a vendor, comprising:

a product key generator for generating, with a digital signature algorithm, a verification key to accompany the software at distribution;

a user key generator for generating, responsive to user identifying information, using the digital signature algorithm, a unique user key using a numeric representation of the user identifying information; and a user key verifier for validating, using the verification key, a relationship between the unique user key and the numeric representation of the user identifying information to determine an access level to the software.

9. The system as set forth in claim 8, with the user identifying information including licensing information.

10. The system as set forth in claim 8 wherein the verification key is embedded in the software.

11. The system as set forth in claim 8 wherein the verification key is packaged with the software as a self-installing distributable package.

12. The system as set forth in claim 8, further comprising:

means for embedding the verification key into the software; and means for embedding a user key verifier into the software, the user key verifier verifying, with the verification key, the relationship between the user key and the user identifying information.

13. The system as set forth in claim 8, further including means for creating a self-installing distributable package containing the verification key, the software, and a user key verifier.

14. The system as set forth in claim 13, further including means for running the self-installing distributable package to embed the verification key and the user key verifier into the software.

15. The system as set forth in claim 8, further comprising means for storing the user key and the user identifying information and user key.

16. The system as set forth in claim 8, with the product key generator further including:

means, using the digital signature algorithm, for generating a private signing key; and means, using the digital signature algorithm, for generating a public verification key.

17. The system as set forth in claim 16, with the user key verifier further including means for signing, using the digital signature algorithm, the numeric representation with the private signing key.

18. The method as set forth in claim 1, with the step of inputting user identifying information including step of inputting licensing information.

\* \* \* \* \*